April 14, 1953 C. S. MORRISON 2,634,748
PRESSURE REGULATOR VALVE
Filed Jan. 8, 1949

INVENTOR.
CHARLES S. MORRISON
BY
ATTORNEYS

Patented Apr. 14, 1953

2,634,748

UNITED STATES PATENT OFFICE 2,634,748

PRESSURE REGULATOR VALVE

Charles S. Morrison, Moline, Ill., assignor to Deere & Company, Moline, Ill., a corporation of Illinois Application January 8, 1949, Serial No. 69,940

9 Claims. (Cl. 137—523)

1

The present invention relates generally to valves and more particularly to fluid flow regulating and controlling valves.

The object and general nature of the present invention is the provision of a combined safety valve and pressure-regulating valve which is so constructed and arranged that the valve may readily be adjusted to govern the pressure normally maintained in the system by the valve and, when desired, may readily be moved into an open position. More particularly, it is an important feature of this invention to provide a common operating member which, when moved in one direction, serves to adjust the pressure normally maintained by the valve and when moved in another direction serves to move the valve into an open position to provide for a free and normally unregulated flow of fluid when desired but without affecting the pressure adjustment of the valve unit.

These and other objects and advantages of the present invention will be apparent to those skilled in the art after a consideration of the following detailed description, taken in conjunction with the accompanying drawings, in which.

Figure 1:
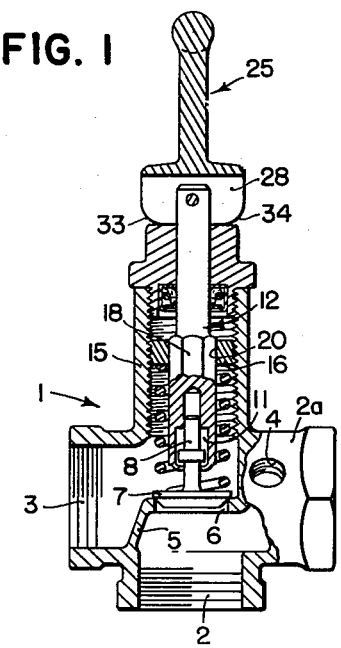
Figure 1 is a sectional view of a valve unit in which the principles of the present invention have been incorporated, the valve unit being shown with the parts in position to maintain a desired amount of pressure in the portion of the system in which the valve is connected.

Referring now to the drawings, particularly Figure 1, the reference numeral 1 indicates the casing of the valve unit and includes an inlet 2, an outlet 2a, the former having a tapered opening 4 to receive a pressure gauge (not shown) or the like, and a return 3. Normally a pump (not shown) is connected to deliver fluid under pressure, which is to be regulated, to the inlet 2 and the outlet 2a is connected to a delivery line, such as a spray unit or the like, the return 3 being connected to a line leading back to the sump of the pump or other storage or reservoir. A partition wall 5 separates the return 3 from the inlet

2 and outlet and is provided with a valve seat 6 against which a poppet valve 7 is normally disposed, as shown in Figure 1. The valve 7 includes a valve stem 8 carrying a flange 9 which is disposed for limited axial movement within a socket 11 formed in the lower end of a lift member 12.

The valve casing 1 includes an interiorly screw-threaded portion 15 which is disposed axially with respect to the valve seat 6, and mounted for axial adjustment within the screw-threaded portion 15 is an abutment member 16 having a non-circular opening 20 centrally thereof and through which the lower non-circular portion 18 of the lift member 12 extends. The upper portion of the latter member is round in cross section and reduced in diameter, extending outwardly through an opening 21 in a cap 22 which forms an outer part of the valve casing 1. Preferably, the abutment member 16 is provided with a hexagonal opening 20 and the lower portion 18 of the lift member 12 is hexagonal in cross section, whereby rotation of the lift member 12 about its axis serves to rotate the member 16 within the screw-threaded portion 15 of the valve casing 1. A spring 23 is disposed within the valve casing 1, bearing at its lower end against the valve 7 and at its upper end against the under face of the abutment member 16.

A handle 25 is hingedly connected, as by a pivot pin 26, to the upper end of the lift member 12, and for this purpose the handle 25 is provided with a bifurcated portion 27 having sides 28 and 29 (Figure 2) which embrace the upper end of the lift member 12. The handle 25 has a transverse gripping portion 31 and each of the side portions is provided with a flat cam section 32 and rounded cam sections 33 and 34 which normally bear against the upper face 35 of the cap 22, which face is flat and lies in a plane perpendicular to the axis of rotation the lift member 12 and the abutment member 16.

Figure 2:
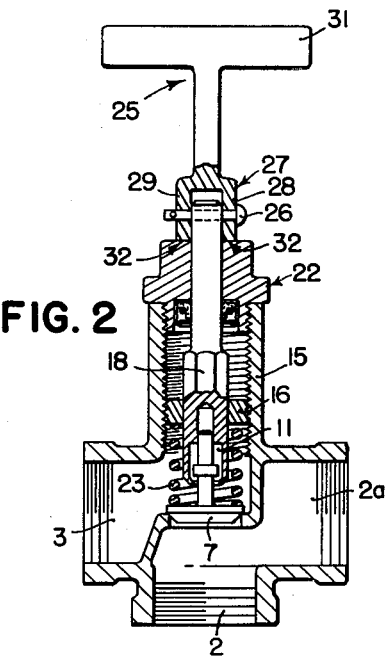
Figure 2 is a view similar to Figure 1, showing the valve unit adjusted to maintain a higher pressure.
Figure 3:
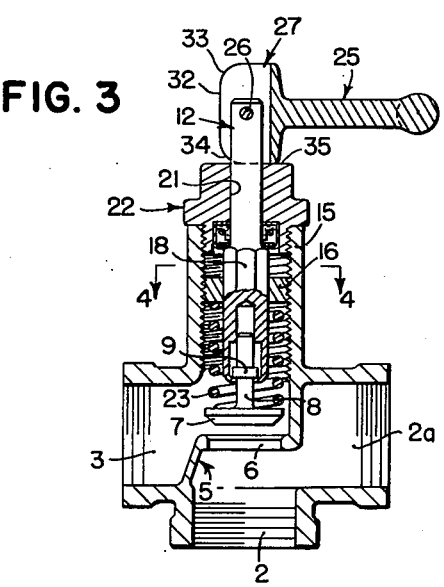
Figure 3 is a view also similar to Figure 1, showing the means provided for moving the valve into its open position, to provide for a relatively free flow of fluid in the associated system, but without losing the pressure regulating adjustment.
Figure 4:
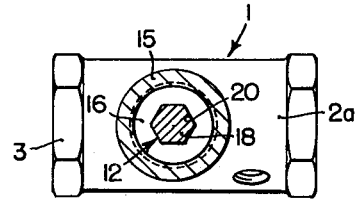
Figure 4 is a sectional view taken generally along the line 4—4 of Figure 3.

The hexagonal portion 18 of the lift member 12 is slidable within the abutment or nut member 16, but whenever the lift member 12 is turned the abutment or nut member 16 is likewise turned within the threaded portion 15 of the valve casing 1. The lift member 12 may be turned when desired by grasping the upper portion 31 of the handle 25 and turning the same in one direction or the other so as to cause the abutment member 16 to travel outwardly or inwardly within the portion 15 of the casing 1, thus decreasing or increasing the pressure with which the spring 23 is caused to bear against the valve 7. This pressure determines the pressure which is normally maintained in the inlet 2 when the parts are arranged as showed in Figure 1. Figure 2 shows the parts when the handle 25 has been turned to run the nut member 16 downwardly within the casing portion 15 to materially increase the pressure normally maintained in the outlet 3. The handle 25, when desired, may be turned downwardly to the position shown in Figure 3, and when this is done, the rounded cam portions 34 of the handle sides 28 and 29 bear against the flat face 35 of the cap 22. This causes the lift member 12 to be raised, and the lower inturned portions of the walls of the socket 11, which engage the flange 9 on the valve stem 8, serve to raise the valve 7 into an open position, providing for a substantially free flow of fluid to the inlet and outlet on the valve. Whenever it is desired to return the valve 7 to its pressure-regulating position, all that it is necessary to do is to return the handle 25 to the position shown in Figure 1. Since the face 35 of the cap 22 is flat and in a plane perpendicular to the axis of rotation of the lift member 18, the handle may be swung downwardly into a valve-opening position in any position of adjustment of the lift member 18 and the abutment 16 about their axis of rotation. Thus, the valve 7 may be opened and closed at any time without affecting the pressure adjustment of the spring 23. Figure 3 shows the handle 25 turned downwardly toward the right for opening the valve, but it will be seen that the handle 25 may be swung downwardly to the left and perform the same valve-opening function.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A combined safety and pressure regulator valve unit, comprising a casing having a valve seat, a valve, a spring for urging said valve against said seat, a part against which said spring bears, a lift member connected with the valve for moving the valve against the force of said spring away from said valve seat, means actuated by rotation of said lift member for adjusting the position of said part to vary the effective pressure exerted by said spring, and means connected with the lift member and movable in one direction to raise the lift member and move said valve and movable in the other direction to rotate said lift member and adjust said part.

2. A combined safety and pressure regulator valve unit, comprising a valve and valve seat, a spring for urging said valve against said seat, a part against which said spring bears, a lift member having a portion underlying a portion of the valve and normally in abutment with said valve for moving the latter against the pressure of said spring away from said seat, means actuated by rotation of said lift member for adjusting the effective pressure of said spring, and a handle connected with said lift member for rotating the latter and swingable relative to said lift member for opening said valve.

3. A combined safety and pressure regulator valve unit, comprising a valve casing having a valve and valve seat, a spring for urging said valve against said seat, a part against which said spring bears, a lift member, means providing a one-way connection between the inner end of said lift member and said valve for moving the latter against the pressure of said spring away from said seat, said one-way connection accommodating opening movement of said valve against the pressure of said spring, as by excess fluid pressure against the valve, without causing movement of said lift member, means whereby rotation of said lift member rotates said spring-adjusting part, and a handle connected with said lift member for rotating the latter and engageable with said casing for shifting said lift member to open said valve.

4. The invention set forth in claim 5, further characterized by said handle having a cam section and said casing having a flat portion disposed in a plane perpendicular to the axis of rotation of said lift member, whereby said handle may be moved to open said valve in any position about the axis of rotation of said lift member without affecting the adjustment of said spring-adjusting part.

5. A valve unit comprising a valve casing having a valve seat and an interiorly screw threaded portion in axial alignment with said valve seat, a valve adapted to seat against said valve seat, a spring bearing at one end against said valve for yieldably holding the valve against said seat, an abutment threaded into said screw threaded portion and disposed in a position receiving the other end of said spring, said abutment having a non-circular opening, a member rotatably connected at its inner end with said valve and having a non-circular section extending through said abutment opening in slidable but non-rotatable relation with respect to said abutment, a handle swingable about a transverse axis relative to and connected non-rotatably with, the outer end of said member for turning the latter so as to turn said abutment within the threaded portion of said valve casing and thus adjust the effective pressure with which said spring holds said valve closed, and a cam section on said handle acting against the valve casing when the handle is swung about said axis for shifting said connecting member outwardly relative to said abutment and the valve casing and opening said valve against the pressure of said spring.

6. In a pressure regulator valve having a valve casing with a valve and valve seat therein, a spring bearing at one end against said valve for yieldably holding the valve against said seat, and a screw-threaded portion in the valve body, the improvement which comprises an abutment threaded into said screw-threaded portion and disposed in a position receiving the other end of said spring, said abutment having a non-circular opening, a member rotatably connected at its inner end with said valve and having a non-circular section extending through said abutment opening in slidable but non-rotatable relation with respect to said abutment, a handle swingable about a transverse axis relative to and connected non-rotatably with, the outer end of said member for turning the latter so as to turn said abutment within the threaded portion of said valve casing and thus adjust the effective pressure with which said spring holds said valve closed, and a cam section on said handle acting against the valve casing when the handle is swung about said axis for shifting said connecting member outwardly relative to said abutment and the valve casing and opening said valve against the pressure of said spring.

7. A valve unit comprising a valve casing having a valve seat and an interiorly screw-threaded portion in axial alignment with said valve seat, a valve having a headed valve stem and adapted to close against said valve seat, a spring bearing at one end against said valve for yieldably holding the valve against said seat, an abutment threaded into said screw threaded portion and disposed in a position receiving the other end of said spring, said abutment having a non-circular opening, a member rotatably connected at its inner end with said valve and having a non-circular section extending through said abutment opening in slidable but non-rotatable relation with respect to said abutment, the inner end of said member having a socket receiving the headed portion of said valve and inwardly directed means engageable under the headed portion of said valve whereby outward movement of said member serves to move said valve off said valve seat, said socket being constructed to accommodate outward movement of said valve against the pressure of said spring, and means on the outer end of said member for optionally turning the latter so as to turn said abutment within the threaded portion of said valve casing and thus adjust the effective pressure with which said spring holds said valves closed or shifting said connecting member outwardly relative to said abutment and the valve casing to open said valve against the pressure of said spring.

8. In a pressure regulator valve having a valve casing with a valve and valve seat therein, a spring bearing at one end against said valve for yieldably holding the valve against said seat, and a screw-threaded portion in the valve body, the improvement which comprises an abutment threaded into said screw-threaded portion and disposed in a position receiving the other end of said spring, said abutment having a non-circular opening, a member rotatably connected at its inner end with said valve and having a non-circular section extending through said abutment opening in slidable but non-rotatable relation with respect to said abutment, a headed portion on said valve, the inner end of said member having a socket receiving the headed portion of said valve and inwardly directed means engageable under the headed portion of said valve whereby outward movement of said member serves to move said valve off said valve seat, said socket being constructed to accommodate outward movement of said valve against the pressure of said spring, and means on the outer end of said member for optionally turning the latter so as to turn said abutment within the threaded portion of said valve casing and thus adjust the effective pressure with which said spring holds said valve closed or shifting said connecting member outwardly relative to said abutment and the valve casing for opening said valve against the pressure of said spring.

9. In a pressure regulator valve having a valve casing with a valve and valve seat therein, a spring bearing at one end against said valve for yieldably holding the valve against said seat, and a screw-threaded portion in the valve body, the improvement which comprises an abutment threaded into said screw-threaded portion and disposed in a position receiving the other end of said spring, said abutment having a non-circular opening, a member rotatably connected at its inner end with said valve and having a noncircular section extending through said abutment opening in slidable but non-rotatable relation with respect to said abutment, means providing a lost-motion connection between the inner end of said member and said valve whereby the latter may be opened by an outward movement of said member and may move relative to said member into an open position out of engagement with said seat, and means on the outer end of said member for optionally turning the latter so as to turn said abutment within the threaded portion of said valve casing and thus adjust the effective pressure with which said spring holds said valve closed or shifting said connecting member outwardly relative to said abutment and the valve casing to open said valve against the pressure of said spring.

CHARLES S. MORRISON.

References Cited in the file of this patent

UNITED STATES PATENTS

| Number | Name | Date |
|--------|------|------|
| 14,429 | Woodbury | Mar. 11, 1856 |
| 140,006 | Brown | June 17, 1873 |
| 247,724 | Whelan | Sept. 27, 1881 |
| 290,450 | Medden | Dec. 18, 1883 |
| 461,237 | Coale | Oct. 13, 1891 |
| 526,176 | Blair | Sept. 18, 1894 |
| 591,015 | Schreidt | Oct. 5, 1897 |
| 1,189,173 | Petersen | June 27, 1916 |
| 1,508,817 | Pfaehler | Sept. 16, 1924 |
| 1,582,938 | Smith | May 4, 1926 |
| 1,679,898 | Gilbert | Aug. 7, 1928 |
| 1,994,958 | Moffett | Mar. 19, 1935 |
| 2,470,372 | Roth | May 17, 1949 |

FOREIGN PATENTS

| Number | Country | Date |
|--------|---------|------|
| 9,449 | Great Britain | of 1886 |